Patented June 3, 1947

2,421,598

UNITED STATES PATENT OFFICE 2,421,598

MULTIVITAMIN COMPOSITIONS

Loran Old Buxton, East Orange, and Sol Tobias Lipsius, Orange, N. J., assignors to Nopco Chemical Company, a corporation of New Jersey No Drawing. Application October 28, 1942, Serial No. 463,664

4 Claims. (Cl. 167—81)

This invention relates to vitamin compositions and more particularly to multi-vitamin compositions dispersible in aqueous media and to correlated improvements in processes for preparing said compositions.

The presently known vitamins may be grouped into two generic classes, fat-soluble vitamins and water-soluble vitamins. Concentrates of fat-soluble vitamins, e. g., vitamins A, D and E concentrates, are ordinarily sold in the form of solutions of the vitamins in the oils in which they occur naturally or in other oils in which they are dissolved. Such solutions of vitamins, however, cannot be readily incorporated into aqueous bodies since they are immiscible therewith; this property is disadvantageous since it is highly desirable to incorporate fat-soluble vitamins into many aqueous food products and medicinal preparations such as milk, tonics and the like. Also in many cases it is highly desirable to have aqueous food products and the like containing substantially all of the vitamins, both fat-soluble and water-soluble, e. g., it would be very desirable indeed to have a milk containing substantially all of the vitamins in such quantities that a pint or a quart thereof would supply all of a person's normal daily requirements. It can readily be seen that it is quite a complex problem to produce a satisfactory, stable, concentrated composition containing substantially all of the vitamins and which is completely water-dispersible in an aqueous medium to give a product containing substantially all of the vitamins with the vitamins being present therein in substantial amounts and in their proper proportions for supplying the body's needs. In the first place, the two major classes of the vitamins, i. e., the fat-soluble and the water-soluble, have widely divergent physical and chemical characteristics; furthermore, the individual vitamins are quite varied in their properties which further complicates the problem. Also, in order to produce a commercially practicable product, it is essential that the composition be quite concentrated; otherwise, in order to obtain the desired vitamin potency in the aqueous food product, such a large amount of the vitamin composition would have to be added thereto that in all probability the characteristics, i. e., taste, color, odor, etc., of the aqueous food product would be affected thereby.

Our copending application, Serial No. 282,128, filed June 30, 1939, now Patent No. 2,311,517, describes a process for producing a water-dispersible composition containing fat-soluble and water-soluble vitamins. While the product described in the aforesaid application has enjoyed commercial success, some difficulty has been encountered in incorporating certain of the water-soluble vitamins into the composition. Particular difficulty has been encountered with riboflavin and vitamin C as these vitamins are very sparingly soluble in water and aqueous alcoholic solutions.

It is the object of this invention to provide improved stable water-dispersible multivitamin compositions containing both fat-soluble vitamins and water-soluble vitamins.

Another object of this invention is to provide an improved process for preparing stable water-dispersible multi-vitamin compositions.

Still another object of this invention is to provide a stable water-dispersible emulsion of substantially all of the vitamins normally ingested.

A further object of this invention is to provide a stable water-dispersible multivitamin composition of such a potency that one cubic centimeter or less will supply substantially all of the average daily vitamin requirements of an individual.

Another object of this invention is to provide milk and other aqueous food products containing all of the vitamins in the proper proportions for supplying the body's needs.

Another object of this invention is to provide dispersions of both water-soluble and fat-soluble vitamins in aqueous media wherein the vitamins will remain highly stable at elevated temperatures.

Other objects of the invention will in part be obvious and will in part appear hereinafter.

We have found that excellent, stable, completely water-dispersible multivitamin compositions containing both fat-soluble vitamins and water-soluble vitamins can be readily and easily prepared by incorporating the vitamins into a solvent comprising ethyl alcohol and a blending solvent selected from the group consisting of glycerine and/or lactic acid. Such multi-vitamin compositions can be easily dispersed in aqueous media so as to produce relatively clear dispersions of high vitamin potencies without any separation of the oily fat-soluble vitamin concentrates. In these vitamin compositions the fat-soluble vitamin concentrates are already in somewhat of a dispersed state instead of entirely in solution as is the case in the compositions of the application hereinabove mentioned. The ease of dispersion of the vitamin compositions is thus increased by the fat-soluble vitamins being in such a dispersed state, and also the stability of the resulting vitamin-fortified aqueous product appears to be enhanced thereby. Furthermore, the presence of the glycerol and/or lactic acid increases the compatibility of the vitamin composition with certain food products. The glycerol and/or lactic acid make the compositions of the invention somewhat more viscous than a solution of the vitamin in ethanol alone, and because of this increased viscosity, vitamins which are susceptible to oxidative deterioration, e. g., vitamins A and C, are more stable therein than in the ethanol solutions, since in the more viscous solutions there will be less surface area coming in contact with oxidizing influence during handling and shipping of the vitamin compositions. The most significant advantage of the presence of glycerol and/or lactic acid is that compositions of considerably higher potencies in vitamin C and riboflavin can be obtained, since it has been found these vitamins have much greater solubility in glycerol and/or lactic acid and mixtures thereof with ethanol than in ethanol alone. This is particularly true in the case of riboflavin as it is only very slightly soluble in ethanol. Glycerine and lactic acid serve as blending solvents in the composition of the invention. Another advantage of the compositions of this invention is that they are less volatile than compositions in which ethanol is used alone, and there is thus much less likelihood of any undesirable changes taking place in the physical characteristics of the vitamin composition through loss of solvent by evaporation. The vitamin compositions of our invention may be permitted to stand for long periods of time without substantial deterioration in the vitamin potencies thereof; this property is highly desirable since the compositions may thus be stored and shipped as desired without danger of a substantial deterioration in their vitamin potencies. In actual storage tests on the vitamin compositions we have found that after periods of as long as six months, no appreciable deterioration of the vitamins therein takes place. Aqueous dispersions of the multivitamin compositions may be prepared by merely mildly agitating the compositions with an aqueous body. These dispersions are capable of standing for long periods of time without breaking. Also they are particularly stable at elevated temperatures, e. g., temperatures in the order of the boiling point of water; this factor is of great advantage in the preparation of many food products, since it permits the vitamins to be readily incorporated into food products during cooking or other high temperature operations. By the process of our invention completely water-dispersible products can be prepared which contain substantially all of the vitamins in the proper ratio for supplying the body's needs and in such a concentration that a very small amount thereof will supply the average daily needs of an individual. For example, compositions may be prepared such that when amounts as small as one-half cc. are added to a pint of milk or skim milk, the milk will supply substantially all of the average daily vitamin requirements of an individual.

The fat-soluble vitamin concentrates which are used in preparing the multivitamin compositions of our invention may be any suitable vitamin or provitamin concentrate or concentrates of vitamins A, D, or E; however, it is preferred that relatively highly potent concentrates of these vitamins be used. Thus, for example, vitamin A concentrates containing from about 300,000 to about 2,500,000 A units per gram, preferably from about 750,000 to 2,500,000 A units per gram, and vitamin D concentrates containing from about 100,000 to about 2,000,000 D units per gram, preferably from about 500,000 to about 2,000,000 D units per gram, may be employed. Mixed A and D concentrates containing from about 800,000 to about 1,800,000 A units per gram and from about 100,000 to about 1,400,000 D units per gram may also be utilized. The concentrates may be prepared in any suitable manner; for example, vitamin A or D concentrates prepared from fish oils, carotene concentrates and vitamin D concentrates obtained by irradiating or otherwise activating sterols, e. g., cholesterol, ergosterol, 7-dehydro cholesterol, etc., or oil solutions thereof, may be employed. Preferably, the vitamin A or D concentrates are prepared by saponification of fish liver oils and extraction of the unsaponified portion with a suitable solvent since these concentrates are relatively inexpensive and form excellent dispersions in aqueous media when employed in the practice of our invention. It is preferred to employ high potency fat-soluble vitamin concentrates from which the portion insoluble in methanol or ethanol at relatively low temperatures has been removed; such high potency concentrates may be obtained by dissolving a fat-soluble vitamin concentrate in methanol or ethanol at room temperature, then cooling the solution to a relatively low temperature, e. g., about $-20°$ C., and separating the insoluble portion (cholesterol, etc.) from the solution. Multivitamin compositions prepared by the process of our invention using such concentrates can be dispersed in aqueous bodies with great ease to give highly desirable fortified products.

The water-soluble vitamins which are employed in the process of our invention may be either concentrates of the naturally-occurring forms of the vitamins or products which have been produced synthetically. Thus members of the vitamin B complex may be added as natural concentrates prepared from materials such as rice bran, rice polishings, milk whey, etc., or they may be added as synthetic materials such as thiamin hydrochloride, synthetic riboflavin, synthetic nicotinic acid amide (niacin), synthetic pantothenic acid or calcium pantothenate, etc. Likewise, the vitamin C employed may be a natural concentrate or the synthetic product.

In carrying out the preferred process of our invention, the desired amounts of the water-soluble vitamins are thoroughly mixed with the glycerine and/or lactic acid until a homogeneous mass is obtained. This mass is diluted with ethanol and the fat-soluble vitamins are added thereto in an ethanol solution thereof. If desired, the fat-soluble vitamin concentrates may be added directly to the solution of ethanol and glycerine and/or lactic acid instead of first dissolving them in ethanol. Of course, other obvious variations in the order or manner of the incorporation of the vitamins into the solvents may be employed. Thus the water-soluble vitamins may be added directly to a mixture of ethanol and glycerine and/or lactic acid either before or after fat-soluble vitamins have been added thereto. The relative proportions of ethanol, glycerol, and lactic acid may vary considerably, but it is preferred that ethanol comprise at least about 50 parts and not more than about 90 parts of every hundred parts of the dispersible vitamin compositions. The amount of glycerine which is used may be as high as about 50 parts for every hundred parts of the vitamin compositions, but in the case of the lactic acid it is preferred not to use more than about 30 parts per every hundred parts of the final dispersible product. Preferably, ethanol should comprise at least about 65% of the vitamin composition. After all of the vitamins have been incorporated therein, the solution is thoroughly mixed to insure the uniform distribution of the vitamins.

Estimates of the amounts of the different vitamins required by an individual vary, but figures given in a table put out by the University of Wisconsin Experiment Station are representative of most recent findings. According to this table an individual should receive each day from 3000 to 6000 International units of vitamin A, from 250 to 300 International units of vitamin $B_1$, about 500 International units of vitamin C, about 400 International units of vitamin D (for children; adults do not require quite that much), 10 to 15 mg. of nicotinamide (niacin amide), and 1 to 2 mg. of vitamin G (riboflavin). In preparing our multivitamin compositions, we prefer in most cases to incorporate therein sufficient amounts of the vitamins so that the resulting product in quantities as small or smaller than 1 cc. contain therein the amounts of the various vitamins as set out hereinabove as being essential to satisfy a person's daily requirements.

In most cases it will be found that the pH of the vitamin compositions will be less than about 5.0. This aids in maintaining the stability of certain of the vitamins, e. g., vitamin $B_1$, and it is therefore decidedly advantageous. The low pH of the compositions may be the result of various factors. It is well known that vitamin C is an acid and therefore it is one factor contributing to the acidity; also, if any lactic acid is employed in the composition, it will lower the pH thereof. Furthermore, if synthetic vitamin $B_1$, i. e., thiamin hydrochloride, is used instead of a natural concentrate to supply the vitamin $B_1$, it will also aid in giving the vitamin compositions a low pH value. In case it is desired to prepare vitamin compositions which do not contain sufficient of the components just mentioned to give the composition a pH of about 5.0 or less, it is preferable to add sufficient amounts of citric, tartaric, or some other similar non-toxic organic acid to the composition to adjust the pH thereof to said value.

The multi-vitamin compositions prepared as above described may be readily mixed with aqueous bodies to produce dispersions of the vitamins in aqueous media. Thus these compositions may be added to aqueous bodies such as water, to aqueous food products such as milk, coffee, tea, chocolate or other flavored drinks, etc., and to aqueous medicinal preparations such as tonics, pharmaceuticals and the like, to form stable products fortified with substantially all of the vitamins. We have found that in order to produce such fortified products, it is merely necessary to add the multivitamin compositions to the aqueous bodies with mild agitation, whereby the vitamins are dispersed in the aqueous media; for example, a multivitamin composition prepared as above described may be added with mild agitation to water, milk, skim milk, fruit juices, coffee, tonics, pharmaceuticals and like, either just prior to consuming the products or at any other suitable time. In practically every case the addition of the vitamin composition causes the immediate formation of dispersions of the vitamins without any appreciable separation of the fat-soluble vitamins. These dispersions formed with aqueous bodies are substantially permanently stable so that the fortified products can be stored and shipped as desired. It was mentioned hereinabove that the vitamin compositions usually have a pH of about five or less; however, in most cases no appreciable change takes place in the pH of an aqueous body upon the addition thereto of the small amount of the vitamin composition required to give the desired vitamin potency to the aqueous medium. Consequently, the natural characteristics of the aqueous body in this respect will not be changed. In preparing vitamin compositions for the fortification of milk, the potency of the compositions with respect to certain vitamins, e. g., vitamin A, need not be as high as in some other cases since milk itself contains appreciable quantities of these vitamins.

The multivitamin compositions may be advantageously modified in various ways without affecting the stability of the final product. For example, natural antioxidant compositions produced by the processes of applications of Loran O. Buxton, Serial No. 351,909, filed August 8, 1940, now Patent No. 2,345,576, and Serial No. 397,547, filed June 11, 1941, now Patent No. 2,345,578, or other suitable antioxidants may be added to enhance the stability of the vitamins A and C. If vitamin E has been incorporated into the multivitamin composition, it will aid in stabilizing the vitamins A and C against oxidation. Flavoring agents, minerals, etc., may also be added to the compositions, if desired.

For a fuller understanding of the nature and objects of the invention, reference should be had to the following examples which are given merely to further illustrate the invention and are not to be construed in a limiting sense.

*Example I*

200 mgs. of crystalline vitamin $B_1$ were mixed with 2.5 gms. of crystalline vitamin C and 12.5 gms. of glycerol, and 20 mls. of ethyl alcohol were added. On warming slightly, a clear solution resulted. To this solution were added 1.1 gms. of a highly potent vitamin A concentrate and 0.1 gm. of a vitamin D concentrate. Sufficient ethanol to make the solution up to 100 mls. was then added. A brilliantly clear homogeneous solution resulted. The final solution had the following analysis:

| | | |
|---|---|---|
| Vitamin A | I. U./cc. | 12,500 |
| Vitamin $B_1$ | I. U./cc. | 600 |
| Vitamin C | I. U./cc. | 500 |
| Vitamin D | I. U./cc. | 1,000 |
| pH | | 3.3 |

This material dispersed readily in water. One-half cubic centimeter thereof was added to a quart of skim milk. No change in the milk could be detected, and the pH thereof was the same after adding the vitamin concentrate as it was before. This amount of the multivitamin composition was sufficient to bring the vitamin potency of the quart of milk up to the average daily adult requirement.

*Example II*

A completely water-dispersible multivitamin composition was prepared essentially as in Example I, the principal difference being that the final product contained 7.5 gms. of glycerol in 100 mls.

*Example III*

By a process essentially the same as that of Example I, 0.9 gm. of a highly potent vitamin A concentrate, 0.1 gm. of a highly potent vitamin D concentrate, 0.3 gm. of vitamin B₁, 2.75 gms. of vitamin C, 2 gms. of nicotinic acid amide, and 0.2 gm. of riboflavin were incorporated into 100 mls. of an ethanol-glycerol solution containing 35 gms. of glycerol. The product which was completely water-dispersible contained per cc. about 9000 I. U. of vitamin A, 1000 I. U. of vitamin B₁, 500 I. U. of vitamin C, 1000 I. U. of vitamin D 30 milligrams of nicotinic acid amide, and 2 mgs. of riboflavin.

*Example IV*

The multivitamin composition prepared in this example differed from the one prepared in Example III only in that 19 gms. of lactic acid and 19 gms. of glycerol were used instead of 35 gms. of glycerol.

*Example V*

In this example a vitamin composition was prepared essentially the same as in Example III, the principal difference being that the glycerol was entirely replaced with lactic acid. The final product was completely water-dispersible.

It will be evident from the above description and examples that our invention provides a process for producing highly potent, stable multivitamin compositions which can be readily dispersed in aqueous bodies to produce stable vitamin-containing aqueous food products and pharmaceuticals.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A readily water-dispersible multivitamin composition comprising ethanol, at least one fat-soluble vitamin, riboflavin, at least one water-soluble vitamin other than riboflavin and a blending solvent selected from the group consisting of glycerine and lactic acid, the riboflavin being present in a ratio of at least one milligram per cubic centimeter of said dispersible composition as a whole.

2. A readily water-dispersible multivitamin composition comprising ethanol, at least one fat-soluble vitamin, riboflavin, at least one water-soluble vitamin other than riboflavin and glycerine, the riboflavin being present in a ratio of at least one milligram per cubic centimeter of said dispersible composition as a whole.

3. A readily water-dispersible multivitamin composition comprising ethanol, at least one fat-soluble vitamin, riboflavin, at least one water-soluble vitamin other than riboflavin and lactic acid, the riboflavin being present in a ratio of at least one milligram per cubic centimeter of said dispersible composition as a whole.

4. A readily water-dispersible multivitamin composition comprising ethanol, a vitamin A and D concentrate, riboflavin, niacin, thiamin, vitamin C and a blending solvent selected from the group consisting of glycerine and lactic acid, the riboflavin being present in a ratio of at least one milligram per cubic centimeter of said dispersible composition as a whole.

LORAN OID BUXTON.
SOL TOBIAS LIPSIUS.

REFERENCES CITED

The following references are of record in the file of this patent:

UNITED STATES PATENTS

| Number | Name | Date |
|---|---|---|
| 2,175,340 | Chesney | Oct. 10, 1939 |
| 2,311,554 | Lipsius | Feb. 16, 1943 |
| 2,311,517 | Buxton et al. | Feb. 16, 1943 |
| 1,786,095 | Takahashi | Dec. 23, 1930 |
| 2,343,254 | Dale | Mar. 7, 1944 |

FOREIGN PATENTS

| Number | Country | Date |
|---|---|---|
| 486,054 | Great Britain | May 30, 1938 |

OTHER REFERENCES

Pharmaceutical Abstracts of the Journal of the American Pharmaceutical Association, vol. 5, page 543, Dec. 1939.

Gutman, Three Year Supplement to New Modern Drugs (1938), pages 94, 153.